US006640751B1

(12) United States Patent
Cool

(10) Patent No.: US 6,640,751 B1
(45) Date of Patent: Nov. 4, 2003

(54) ANIMAL SUPPORT APPARATUS

(76) Inventor: Dana J. Cool, 261 W. Monroe St. #3, Little Falls, NY (US) 13365

( * ) Notice: Subject to any disclaimer, the term of this patent is extended or adjusted under 35 U.S.C. 154(b) by 0 days.

(21) Appl. No.: 10/215,615

(22) Filed: Aug. 9, 2002

(51) Int. Cl.[7] .................... A01K 15/04; A61D 3/00
(52) U.S. Cl. ............................. 119/727; 119/728
(58) Field of Search .................. 119/725, 726, 119/727, 728, 850; 54/79.2

(56) References Cited

U.S. PATENT DOCUMENTS

| 346,285 | A | * | 7/1886 | Hime | .................... 119/725 |
| 2,976,840 | A | * | 3/1961 | Hugus | .................... 119/727 |
| 4,186,689 | A | | 2/1980 | Alexander et al. | |
| 4,489,677 | A | | 12/1984 | Handley | |
| 4,767,099 | A | | 8/1988 | Munks | |
| 4,831,967 | A | | 5/1989 | Anderson | |
| 5,823,146 | A | | 10/1998 | Alaniz et al. | |
| 5,842,443 | A | * | 12/1998 | Steinfort | .................... 119/726 |
| D434,535 | S | | 11/2000 | Koch | |
| 6,431,123 | B1 | * | 8/2002 | Hibbert | .................... 119/850 |

* cited by examiner

Primary Examiner—Charles T. Jordan
Assistant Examiner—Elizabeth Shaw

(57) ABSTRACT

An animal support apparatus for providing supplemental vertical support to ease strain on portions of an animal during a process of medical rehabilitation is provided. The animal support apparatus includes an elongate flexible sheet member for positioning about a belly and sides of an animal. The sheet member is generally oval-shaped and has a plurality of apertures for receiving the limbs of the animal. The sheet member comprises a substantially flexible cloth material and has a cushioned material attached to an inner side of the sheet member. The sheet member has a plurality of handle sections for lifting the sheet member upward such that limbs of the animal are relieved of a portion of a weight of the animal to facilitate the process of medical rehabilitation of one of the limbs or other related parts of the animal. One each of the handle sections is located at outer ends of the sheet member. The sheet member is attachable to a mobile support frame for allowing the animal to remain suspended at a predetermined height to facilitate the process of medical rehabilitation.

13 Claims, 2 Drawing Sheets

ANIMAL SUPPORT APPARATUS

BACKGROUND OF THE INVENTION

1. Field of the Invention

The present invention relates to animal slings and more particularly pertains to a new animal support apparatus for providing supplemental vertical support to ease strain on portions of an animal during a process of medical rehabilitation.

2. Description of the Prior Art

The use of animal slings is known in the prior art. U.S. Pat. No. 4,831,967 describes a animal lift frame that provides a mechanically adjustable support structure for restraint and skeletal support of an animal. Another type of animal sling is U.S. Pat. No. 4,489,677 having a stretcher, which upon being placed beneath an animal can be supported and raised by a lifting means.

While these devices fulfill their respective, particular objectives and requirements, the need remains for a device that is simplistic in design and use such that it can be utilized by both animal caregivers, and owners to help the animal recover from an injury or surgery.

SUMMARY OF THE INVENTION

The present invention meets the needs presented above by utilizing a one-piece design making it simple to use while assisting the animal to walk or maneuver during the rehabilitation process.

Still yet another object of the present invention is to provide a new animal support apparatus that is light and versatile to facilitate use by the user.

Even still another object of the present invention is to provide a new animal support apparatus that includes a unique cutout section positioned such that it allows the animals to relieve themselves while being positioned in the device.

To this end, the present invention generally comprises an elongate flexible sheet member for positioning about a belly and sides of an animal. The sheet member is generally oval-shaped and has a plurality of apertures for receiving the limbs of the animal. The sheet member comprises a substantially flexible cloth material and has a cushioned material attached to an inner side of the sheet member. The sheet member has a plurality of handle sections for lifting the sheet member upward such that limbs of the animal are relieved of a portion of a weight of the animal to facilitate the process of medical rehabilitation of one of the limbs or other related parts of the animal. One each of the handle sections is located at outer ends of the sheet member. The sheet member is attachable to a mobile support frame for allowing the animal to remain suspended at a predetermined height to facilitate the process of medical rehabilitation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
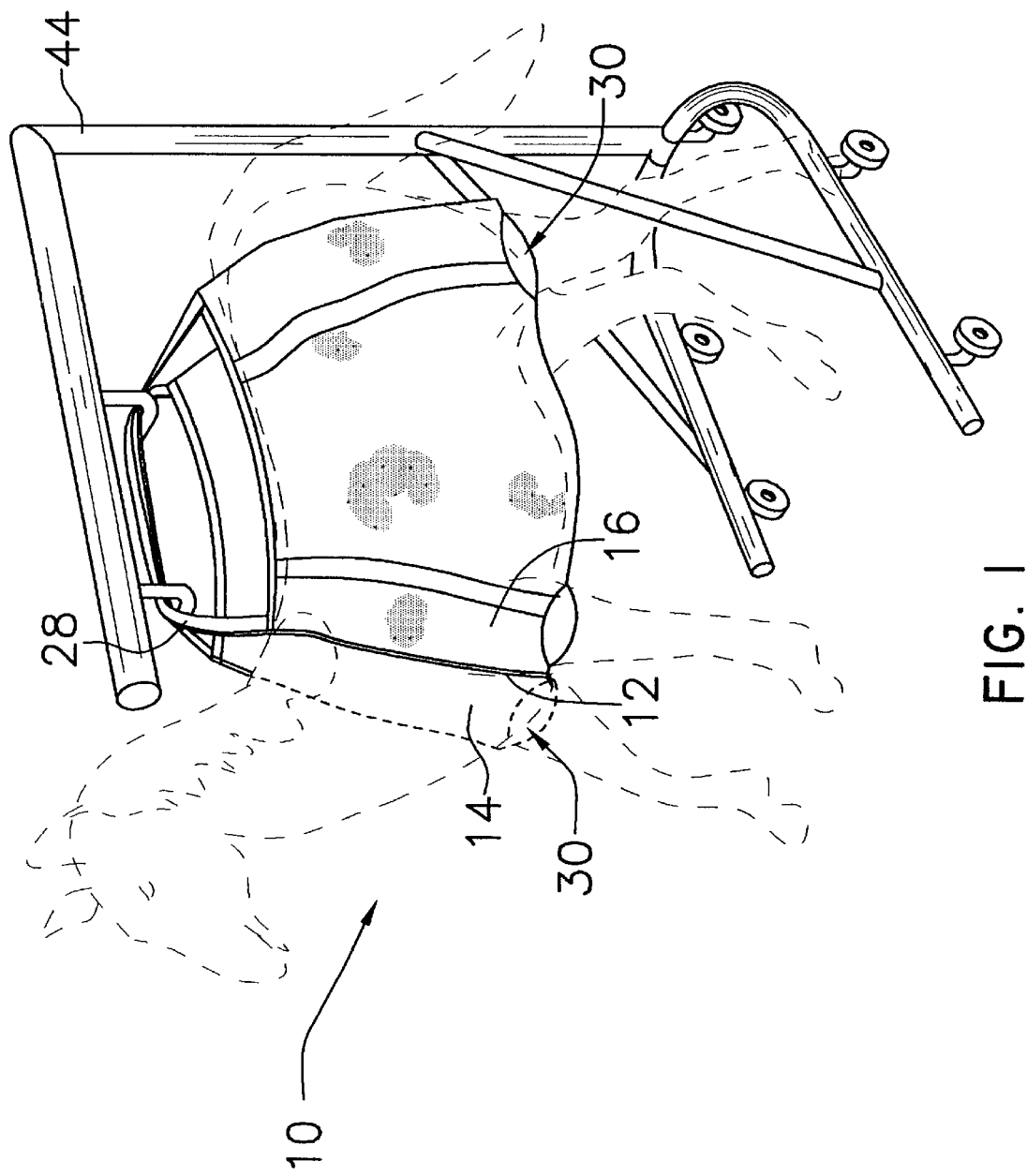
FIG. 1 is a schematic perspective view of a new animal support apparatus being used in conjunction with a support frame according to the present invention.
Figure 2:
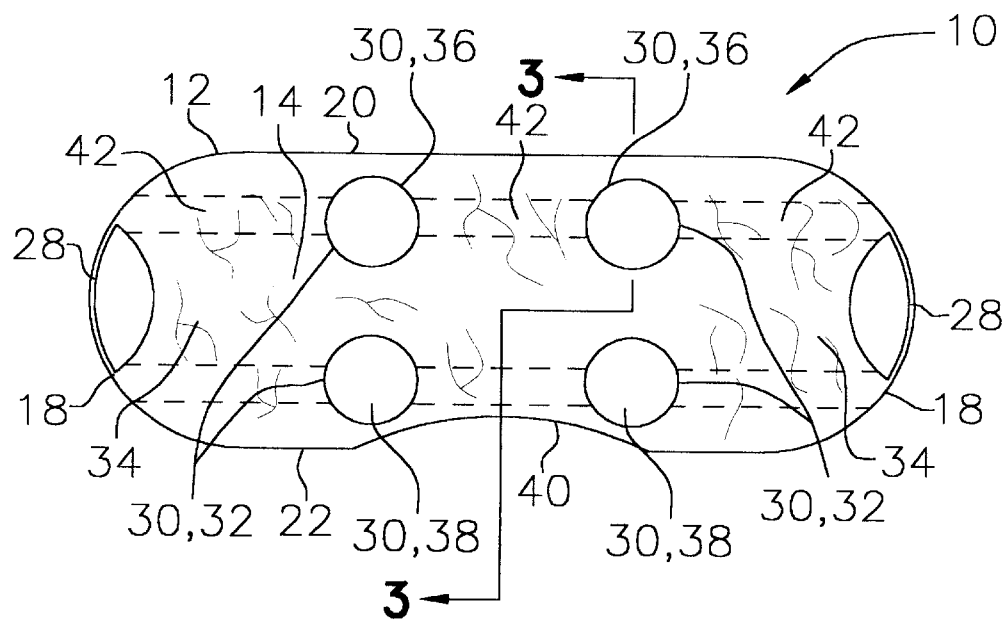
FIG. 2 is a schematic top view of the present invention.
Figure 3:
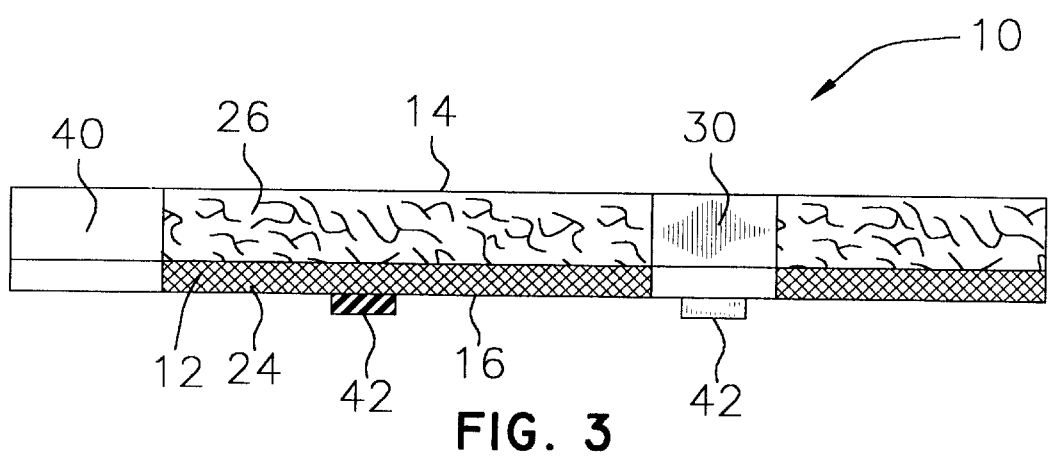
FIG. 3 is a schematic cross-sectional end view of the present invention as taken along section lines 3—3 in FIG. 2.

With reference now to the drawings, and in particular to FIGS. 1 through 3 thereof, a new animal support apparatus embodying the principles and concepts of the present invention and generally designated by the reference numeral 10 will be described.

As best illustrated in FIGS. 1 through 3, the animal support apparatus 10 generally comprises an elongate flexible sheet member 12 for positioning about a belly and sides of an animal. The sheet member 12 has an inner side 14 and an outer side 16, is generally oval-shaped, and has a pair of outer ends 18. The sheet member 12 has a front edge 20 and a rear edge 22. The sheet member 12 comprises a substantially flexible cloth material 24 and has a cushioned material 26 attached to the inner side 14 to provide comfort to the animal.

The sheet member 12 has a plurality of handle sections 28 for lifting the sheet member 12 upward such that limbs of the animal are relieved of a portion of a weight of the animal to facilitate the process of medical rehabilitation of one of the limbs or other related parts of the animal. One each of the handle sections 28 is located at the outer ends 18 of the sheet member 12.

The sheet member 12 has a plurality of apertures 30 for receiving the limbs of the animal. The plurality of apertures 30 comprises two pairs of openings 32 for receiving a left and right set of limbs of the animal. Each of the pairs of openings 32 are symmetrically positioned on opposite sides 34 of a central transverse axis and are oriented substantially perpendicular to a longitudinal axis of the sheet member 12. The pairs of openings 32 include a front set 36 and rear set 38 of openings positioned generally adjacent to the front and rear edges 20, 22 respectively.

The rear edge 22 of the sheet member 12 includes an arcuate cutout 40 for providing clearance for the animal to urinate while positioned in the sheet member 12. The arcuate cutout 40 is centrally located across a width of the sheet member 12.

A plurality of strap sections 42 reinforces the sheet member 12. Each of the strap sections 42 is mounted on the outer side 16 of the sheet member 12. Each of the strap sections 42 is oriented substantially parallel to the longitudinal axis of the sheet member 12 and is generally aligned with one each of a respective front set 36 and rear set 38 of openings.

The sheet member 12 is attachable to a mobile support frame 44 for allowing the animal to remain suspended at a predetermined height to facilitate the process of medical rehabilitation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal support apparatus for providing supplemental vertical support to ease strain on portions of an animal during a process of medical rehabilitation, said apparatus comprising:

an elongate flexible sheet member for positioning about a belly and sides of an animal, said sheet member having an inner side and an outer side;

said sheet member having a plurality of handle sections for lifting said sheet member upward such that limbs of the animal are relieved of a portion of a weight of the animal to facilitate the process of medical rehabilitation of one of the limbs or other related parts of the animal; and a support frame having a generally U-shaped wheeled base portion and a single generally L-shaped support arm extending up from a medial portion of said base portion, said support frame further including a pair of bracing arm portions extending up and back from respective sides of said base portion and being coupled to said support arm for bracing said support arm during use, said handles of said sheet member being couplable to a plurality of hooks extending down from said support arm whereby said support frame supports weight of the animal.

2. The animal support apparatus as set forth in claim 1, further comprising said sheet member having a front edge and a rear edge, said rear edge including an arcuate cutout for providing clearance for the animal to urinate while positioned in said sheet member.

3. The animal support apparatus as set forth in claim 2, further comprising said plurality of apertures comprising two pairs of openings for receiving a left and right set of limbs of the animal.

4. The animal support apparatus as set forth in claim 3, wherein each of said pairs of openings is symmetrically positioned on opposite sides of a central transverse axis and are oriented substantially perpendicular to a longitudinal axis of said sheet member.

5. The animal support apparatus as set forth in claim 3, further comprising said pairs of openings including a front and rear set of openings positioned generally adjacent to said front and rear edges respectively.

6. The animal support apparatus as set forth in claim 5, further comprising a plurality of strap sections for reinforcing said sheet member, each of said strap sections being mounted on said outer side of said sheet member, each of said strap sections being oriented substantially parallel to a longitudinal axis of said sheet member and being generally aligned with one each of a respective said front and rear sets of openings.

7. The animal support apparatus as set forth in claim 2, wherein said arcuate cutout is centrally located across a width of said sheet member.

8. The animal support apparatus as set forth in claim 1, further comprising said sheet member being generally oval-shaped and having a pair of outer ends.

9. The animal support apparatus as set forth in claim 8, further comprising one each of said handle sections being located at said outer ends of said sheet member.

10. The animal support apparatus as set forth in claim 1, further comprising said sheet member having a plurality of apertures for receiving the limbs of the animal.

11. The animal support apparatus as set forth in claim 1, further comprising said sheet member comprising a substantially flexible cloth material and having a cushioned material attached to said inner side to provide comfort to the animal.

12. The animal support apparatus as set forth in claim 1, wherein said sheet member is attachable to a mobile support frame for allowing the animal to remain suspended at a predetermined height to facilitate the process of medical rehabilitation.

13. An animal support apparatus for providing supplemental vertical support to ease strain on portions of an animal during a process of medical rehabilitation, said apparatus comprising:

an elongate flexible sheet member for positioning about a belly and sides of an animal, said sheet member having an inner side and an outer side, said sheet member being generally oval-shaped and having a pair of outer ends, said sheet member having a front edge and a rear edge, said sheet member comprising a substantially flexible cloth material and having a cushioned material attached to said inner side to provide comfort to the animal;

said sheet member having a plurality of handle sections for lifting said sheet member upward such that limbs of the animal are relieved of a portion of a weight of the animal to facilitate the process of medical rehabilitation of one of the limbs or other related parts of the animal, one each of said handle sections being located at said outer ends of said sheet member;

said sheet member having a plurality of apertures for receiving the limbs of the animal, said plurality of apertures comprising two pairs of openings for receiving a left and right set of limbs of the animal, each of said pairs of openings being symmetrically positioned on opposite sides of a central transverse axis and are oriented substantially perpendicular to a longitudinal axis of said sheet member, said pairs of openings including a front and rear set of openings positioned generally adjacent to said front and rear edges respectively;

said rear edge of said sheet member including an arcuate cutout for providing clearance for the animal to urinate while positioned in said sheet member, wherein said arcuate cutout is centrally located across a width of said sheet member:

a plurality of strap sections for reinforcing said sheet member, each of said strap sections being mounted on said outer side of said sheet member, each of said strap sections being oriented substantially parallel to a longitudinal axis of said sheet member and being generally aligned with one each of a respective said front and rear sets of openings; and a support frame having a generally U-shaped wheeled base portion and a single generally L-shaped support arm extending up from a medial portion of said base portion, said support frame further including a pair of bracing arm portions extending up and back from respective sides of said base portion and being coupled to said support arm for bracing said support arm during use, said handles of said sheet member being couplable to a plurality of hooks extending down from said support arm whereby said support frame supports weight of the animal.

* * * * *